United States Patent
Buch et al.

(10) Patent No.: US 9,086,056 B2
(45) Date of Patent: Jul. 21, 2015

(54) PLANETARY TRANSMISSION OF A WIND TURBINE

(75) Inventors: Stephan Buch, Schweinfurt (DE); Frank Steinhaus, Köln (DE)

(73) Assignee: AKTIEBOLAGET SKF, Gothenburg (SE)

( * ) Notice: Subject to any disclaimer, the term of this patent is extended or adjusted under 35 U.S.C. 154(b) by 11 days.

(21) Appl. No.: 14/003,661

(22) PCT Filed: Mar. 6, 2012

(86) PCT No.: PCT/EP2012/053806
§ 371 (c)(1), (2), (4) Date: Nov. 18, 2013

(87) PCT Pub. No.: WO2012/120005
PCT Pub. Date: Sep. 13, 2012

(65) Prior Publication Data
US 2014/0066245 A1    Mar. 6, 2014

(30) Foreign Application Priority Data
Mar. 8, 2011    (DE) .......................... 10 2011 005 240

(51) Int. Cl.
*F16H 57/08* (2006.01)
*F03D 11/00* (2006.01)
*F03D 11/02* (2006.01)
*F16C 35/067* (2006.01)

(52) U.S. Cl.
CPC ............ *F03D 11/0008* (2013.01); *F03D 11/02* (2013.01); *F16C 35/067* (2013.01); *F05B 2240/54* (2013.01); *F05B 2250/232* (2013.01); *F05B 2260/30* (2013.01); *F05B 2260/40311* (2013.01); *F16C 2361/61* (2013.01); *F16H 2057/085* (2013.01); *Y02E 10/722* (2013.01)

(58) Field of Classification Search
CPC    F16H 2057/085; F03D 11/0008; F16C 19/00
USPC .................................................... 475/331, 348
See application file for complete search history.

(56) References Cited

U.S. PATENT DOCUMENTS 5,219,232 A * 6/1993 Adams et al. ................. 384/275
5,368,528 A * 11/1994 Farrell ........................... 475/348
8,062,165 B2 * 11/2011 Chen et al. ..................... 475/331

(Continued)

FOREIGN PATENT DOCUMENTS

DE    102006051817 A1    5/2008
EP    1321687 A1    6/2003

(Continued)

*Primary Examiner* — Tisha Lewis
(74) *Attorney, Agent, or Firm* — Bryan Peckjian; SKF USA Inc. Patent Dept.

(57) ABSTRACT

A planetary transmission of a wind turbine includes a ring gear which has an internal toothing and at least one planetary gear which has an external toothing that meshes with the internal toothing of the ring gear. The planetary gear is rotatably supported on an axle by a bearing assembly. The bearing assembly includes at least one outer ring having a radially-outwardly-protruding radial projection and at least one set of rolling elements that roll on the outer ring. The planetary gear has a bore and a recess in the region of an axial end, which recess widens the bore. The outer ring is disposed in the bore of the planetary gear such that the radial projection of the outer ring engages into the recess of the planetary gear.

14 Claims, 4 Drawing Sheets

(56) References Cited

U.S. PATENT DOCUMENTS 8,657,578 B2 * 2/2014 Nakashima et al. ...... 416/170 R
2009/0190870 A1 7/2009 Chen et al.

FOREIGN PATENT DOCUMENTS

| JP | 03014947 A | * | 1/1991 |
| WO | 02079644 A1 | | 10/2002 |

* cited by examiner

PLANETARY TRANSMISSION OF A WIND TURBINE

CROSS-REFERENCE

This application is the U.S. National Stage of International Application No. PCT/EP2012/053806 filed on Mar. 6, 2012, which claims priority to German patent application no. 10 2011 005 240.2 filed on Mar. 8, 2011.

FIELD OF THE INVENTION

The invention relates to a planetary transmission of a wind turbine, and to a wind turbine. Furthermore, the invention relates to a rolling-element bearing assembly of a planetary transmission of a wind turbine.

BACKGROUND

In a wind turbine, electric energy is generated using a generator from a rotational movement of a rotor shaft, which is driven by a rotor. Depending on the available range of rotational speeds, different types of generators are used in view of an efficient generation of energy. These types differ significantly with respect to their sizes and the use of material and production expense, which are required for their manufacture. In order to make possible the use of generators which are as compact as possible, and as inexpensive as possible to manufacture, wind turbines are therefore often equipped with transmissions, which translate the rotational speed of the rotor shaft to a range of rotational speeds, for which a desired type of generators is suitable. In view of the enormous forces and torques, which occur in particular in high-power wind turbines, i.e. in the MW range, planetary transmissions have proven to be particularly suitable.

The gears of the planetary transmission used are rotatably supported in part by rolling-element bearings. Thus for example the planetary gears of a planetary transmission used in wind turbines are rotatably supported by a bearing assembly which includes a plurality of outer rings that are disposed axially adjacent. The outer rings are disposed in a bore of the planetary gear and are connected to the planetary gear by a press-fit so that they rotate together. In addition, the outer rings are secured against axial displacement by a spring ring which is disposed between adjacent outer rings and engages in a radial groove in the planetary gear. Despite the rotationally-fixed connection of the outer rings to the planetary gear, a migration of the outer rings can occur. This migration can sometimes lead to significant wear of the spring ring which is axially adjacent to the outer rings, even though only relatively small axial forces are to be expected in the constructions used. Wear of the spring ring can for example lead to consequential damages to the entire bearing assembly by separated chips.

The problems caused by the migration of the outer rings can for example be avoided by omitting the outer rings and the spring ring and by forming the rolling-element bearing raceways and the stop flange as one-part with the planetary gear. However, with respect to good operating properties and a long service life, such a design sets minimum requirements on the material composition of the planetary gear, at least in the region of the rolling-element raceways. In addition, a relatively expensive processing of the planetary gear is required in general to form a suitable geometry of the rolling-element bearing raceways and of the stop flanges, as well as a suitable surface finish. The requirements and the expense can be held somewhat lower if one keeps the outer rings and merely replaces the spring ring with a spacer ring which is formed as one-part with the planetary gear.

SUMMARY

The object underlying the invention is to prevent, as much as possible, or at least to limit, damage caused by migrating outer rings in a bearing assembly of a planetary gear of a planetary transmission of a wind turbine.

The inventive planetary transmission of a wind turbine includes a ring gear having an internal toothing, and at least one planetary gear having an external toothing, which meshes with the internal toothing of the ring gear. The planetary gear is rotatably supported on an axle by a bearing assembly. The bearing assembly includes at least one outer ring having a radially-outwardly-protruding radial projection, and at least one set of rolling elements, which roll on the outer ring. The planetary gear has a bore, and a recess in the region of an axial end, which recess radially widens the bore. The outer ring is disposed in the bore of the planetary gear such that the radial projection of the outer ring engages in the recess of the planetary gear.

The invention has the advantage that it substantially reduces, with relatively little expense, the risk of damage in a planetary transmission by migrating outer rings.

The recess of the planetary gear can in particular be formed as a step.

The outer ring can be attached to the planetary gear. In particular, the outer ring can be connected to the planetary gear by a press-fit so that they rotate together. In this way, damage caused by migration of the outer ring can be reduced.

The radial projection of the outer ring can be formed as one-part with the outer ring. This makes possible a particularly favorable relationship between size and mechanical stability.

The radial projection of the outer ring can be disposed in the region of an axial end of the outer ring and/or can axially abut on the planetary gear.

Moreover, the radial projection of the outer ring can end axially flush with the planetary gear, or can be set back axially with respect to the axial end of the planetary gear. This embodiment has the advantage that, in comparison to a conventional outer ring without a radial projection, it requires no additional installation space in the axial direction.

The outer ring can include a cylindrical seat surface, which abuts in contact with the planetary gear, and the radial projection of the outer ring can protrude radially outward beyond the seat surface.

A plurality of sets of rolling elements can roll axially adjacently to one another on the outer ring. Furthermore, a plurality of outer rings can be disposed axially adjacent to one another.

The bearing assembly can include at least one inner ring, which is disposed on the axle and is in particular connected to the axle so that they rotate together. Furthermore, the inner ring can axially abut on a support.

The invention further relates to a wind turbine including an inventively formed planetary transmission.

In addition, the invention relates to a rolling-element bearing assembly of a planetary transmission of a wind turbine. The inventive rolling-element bearing assembly includes a planetary gear having an external toothing, and a bearing assembly which rotatably supports the planetary gear on an axle. The bearing assembly includes at least one outer ring having a radially-outwardly-protruding radial projection, and at least one set of rolling elements which roll on the outer ring. The planetary gear has a bore, and a recess in the region of an axial end, which recess radially widens the bore. The outer ring is disposed in the bore of the planetary gear such that the radial projection of the outer ring engages in the recess of the planetary gear.

BRIEF DESCRIPTION OF THE DRAWINGS

The invention is explained below with reference to the exemplary embodiment shown in the drawings.

DETAILED DESCRIPTION

Figure 1:
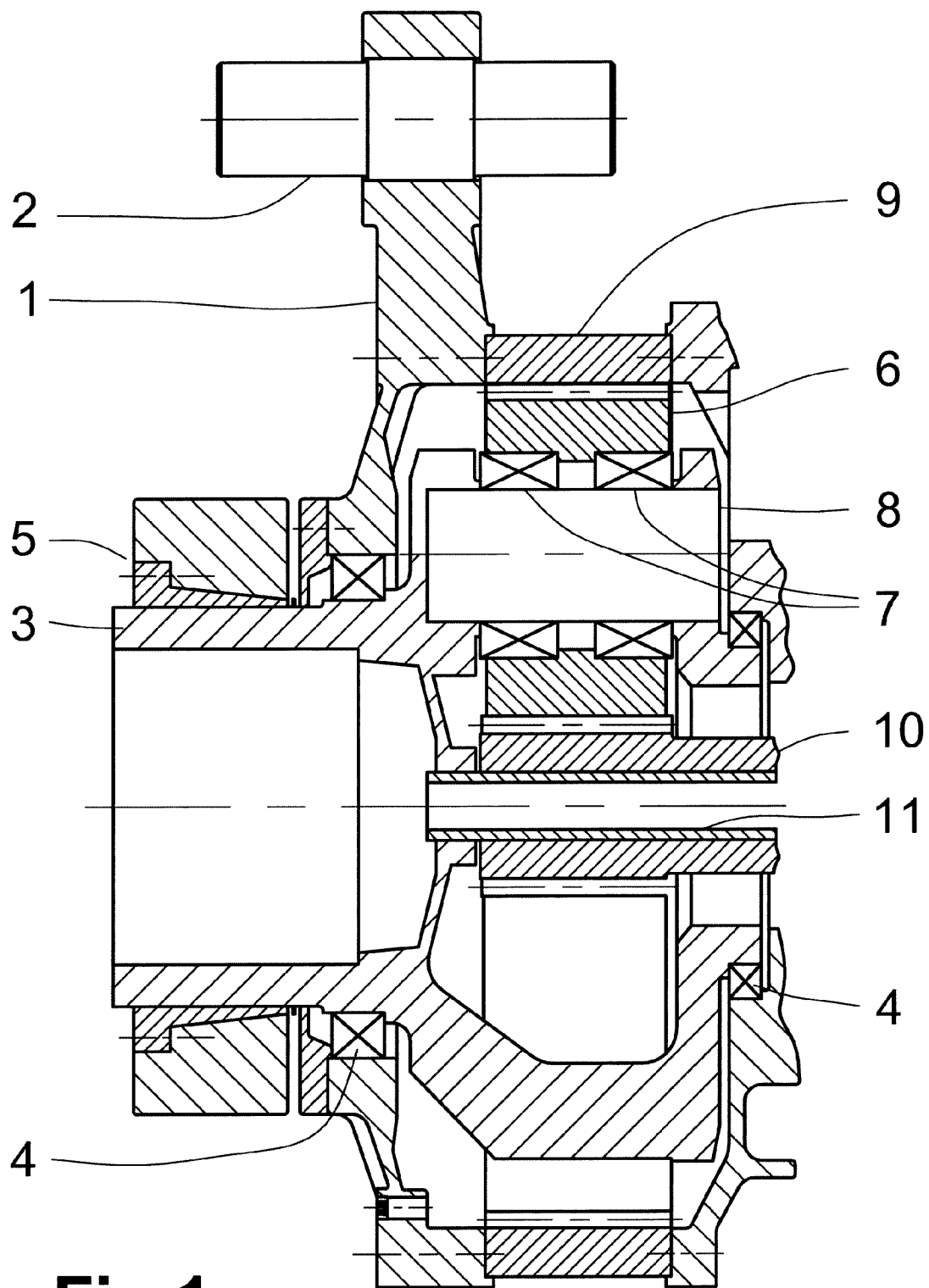
FIG. 1 shows an exemplary embodiment of an inventive planetary transmission of a wind turbine, including an inventively formed rolling-element bearing assembly in section view, FIGS. 2, 3, and 4 respectively show, in sectional view, various exemplary embodiments of the inventive rolling-element bearing assembly of the inventive planetary transmission shown in FIG. 1.

FIG. 1 shows an exemplary embodiment of an inventive planetary transmission of a wind turbine, including an inventively formed rolling-element bearing assembly in sectional view.

The planetary transmission includes a housing 1, which can be fixedly anchored on the wind turbine using bolts 2. Furthermore, the planetary transmission includes a support 3, which is rotatably supported in housing 1 using a bearing assembly 4 and is equipped on one axial end with a coupling 5. At this axial end, a rotor shaft which is not illustrated in the Figures can be introduced into the support 3 and connected to the support 3 so as to rotate therewith using the coupling 5.

The support 3 supports a plurality of, for example three, gears formed as planetary gears 6 having external toothing. The planetary gears 6 are each rotatably supported on an axle 8 by a bearing assembly 7, which axle 8 is connected to the support 3 so that they rotate together. The planetary gears 6 are disposed inside a ring gear 9 having an internal toothing, wherein the external toothing of the planetary gears 6 each mesh with the internal toothing of the ring gear 9. The ring gear 9 is connected to the housing 1 in a rotationally fixed manner. Furthermore, the planetary gears 6 surround a gear having an external toothing, which gear is formed as a sun gear 10, such that the planetary gears 6 each mesh with the external toothing of the sun gear 10. The sun gear 10 can be connected with a generator shaft, which is not illustrated in the Figures, so as to rotate therewith, or with a further transmission stage which is not illustrated in the Figures. A rotor 11 is disposed inside the sun gear 10.

The rotational movement of the rotor shaft is converted by the planetary transmission into a significantly faster rotational movement of the generator shaft, so that an efficient operation of the generator is possible.

Figure 2:
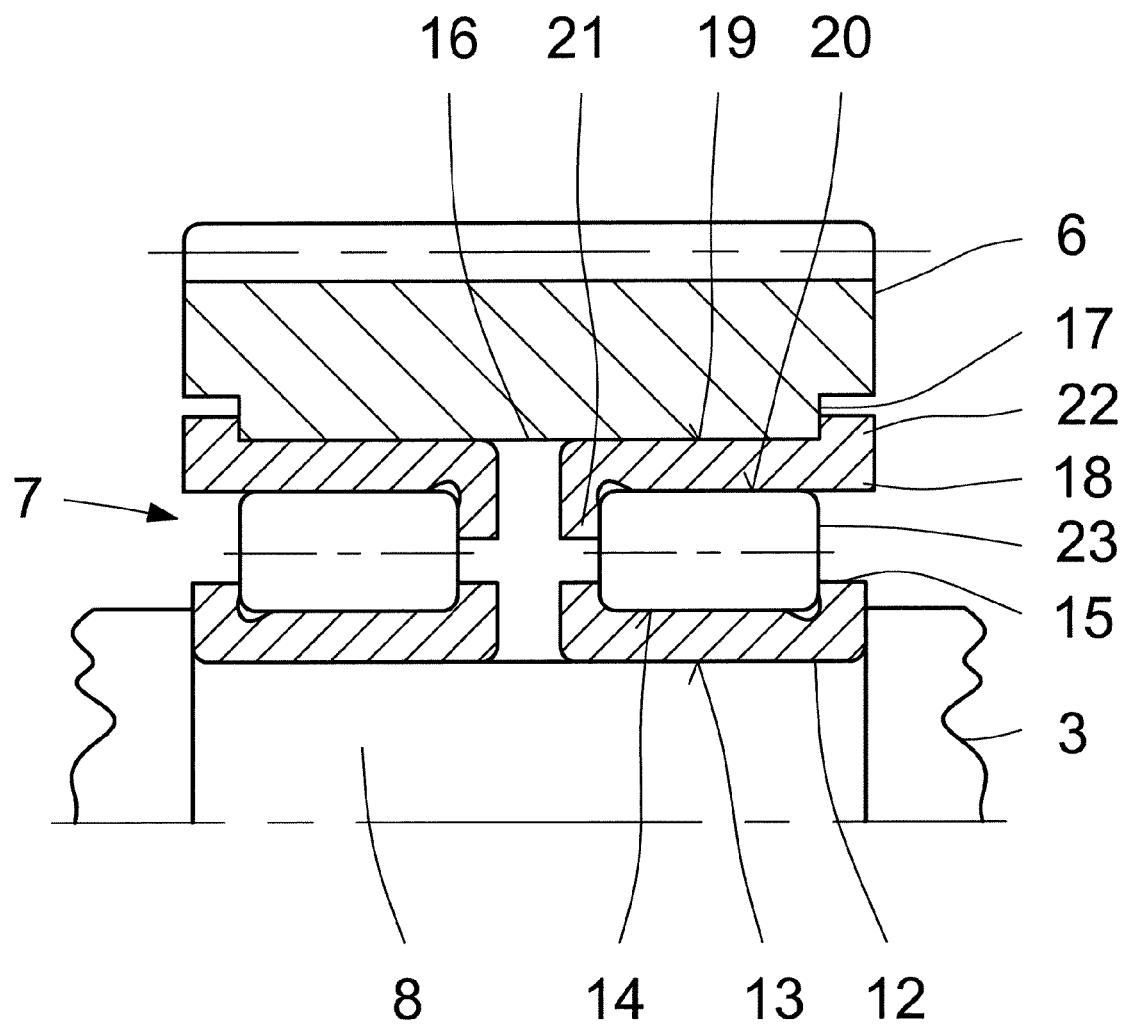

FIG. 2 shows, in section view, an exemplary embodiment of the inventive rolling-element bearing assembly of the inventive planetary transmission shown in FIG. 1.

In the exemplary embodiment shown, two inner rings 12 are disposed spaced apart and axially adjacent to each other on the axle 8, and respectively axially abut on the support 3. The inner rings 12 have cylindrical seat surfaces 13, which can abut on the axle 8 with a preload, so that the inner rings 12 are connected with a press-fit to the axle 8 so that they rotate together. Each inner ring 12 has a cylindrical rolling-element raceway 14, which is delimited axially on both sides by a stop flange 15.

The planetary gear 6 has a bore 16, which has a radial extension in the form of a step 17 or another type of recess at both axial ends of the planetary gear 6. Two outer rings 18 are disposed in the bore 16 axially adjacent to each other and spaced-apart. The outer rings 18 have cylindrical seat surfaces 19 which can abut on planetary gear 6 in the bore 16 with a preload, so that the outer rings 18 are connected by a press-fit to the planetary gear 6 so that they rotate together. Each outer ring 18 has a cylindrical rolling-element bearing raceway 20 which is delimited axially on one side by a stop flange 21, which side is oriented towards the axial center of the bore 16. No stop flange 21 is provided on the other side. Instead, on the other side a radial projection 22 is formed, which protrudes radially outward beyond the seat surface 19 of the outer ring 18, and radially overlaps with the planetary gear 6. Here the radial projection 22 of the outer ring 18 engages into the step 17 of the planetary gear 6 and axially abuts on the planetary gear 6 in the region of the step 17. The step 17 of the planetary gear 6 and the radial projection 22 can be matched to each other such that the radial projection 22 ends axially flush with the planetary gear 6. Likewise, it is also possible that the radial projection 22 is axially set back with respect to the axial end of the planetary gear 6.

Furthermore, two sets of cylindrical rolling elements 23 which are disposed axially adjacent to each other are shown in FIG. 2, which rolling elements 23 roll on the rolling element raceways 14 of the inner rings 12 and the rolling element raceways 20 of the outer rings 18. Accordingly, in the illustrated exemplary embodiment, the planetary gear 6 is supported by two axially-adjacently-disposed cylindrical roller bearings.

The rolling-element bearing assembly shown in FIG. 2 is held together such that a movement of the inner rings 12 out of the bore 16 is prevented by the axial abutment of the inner rings 12 on the support 3. A movement of the outer rings 18 out of the bore 16 is thus also prevented by the stop flanges 15 of the inner rings 12, which stop flanges 15 are oriented outwardly of the bore 16, by the rolling elements 23, and by the stop flanges 21 of the outer rings 18. A movement of the outer rings 18 deeper into the bore 16 is prevented by the axial abutment of the radial projections 22 of the outer rings 18 on the planetary gear 6. A movement of the inner rings 12 deeper into the bore 16 is thus also prevented by the stop flanges 21 of the outer rings 18, by the rolling elements 23, and by the stop flanges 15 of the inner rings 12, which stop flanges 15 are oriented outwardly of the bore 16. The radial projections 22 of the outer rings 18 thus have the consequence that other measures for axial securing of the outer rings 18, such as for example spring rings which are partially embedded in radial grooves, can be omitted. Such spring rings can be worn out over time when utilized in wind turbines, even though in a cylindrical roller bearing for this application one expects, at most, low axial forces. In contrast, the radial projections 22 have a substantially longer service life, since these are formed relatively solid and from a very high-quality material and with a high surface quality. In addition, chips that may be generated would not arise in the middle of the rolling-element bearing assembly, but only in the edge regions, so that there is a lower likelihood of damaging the bearing 7.

Figure 3:
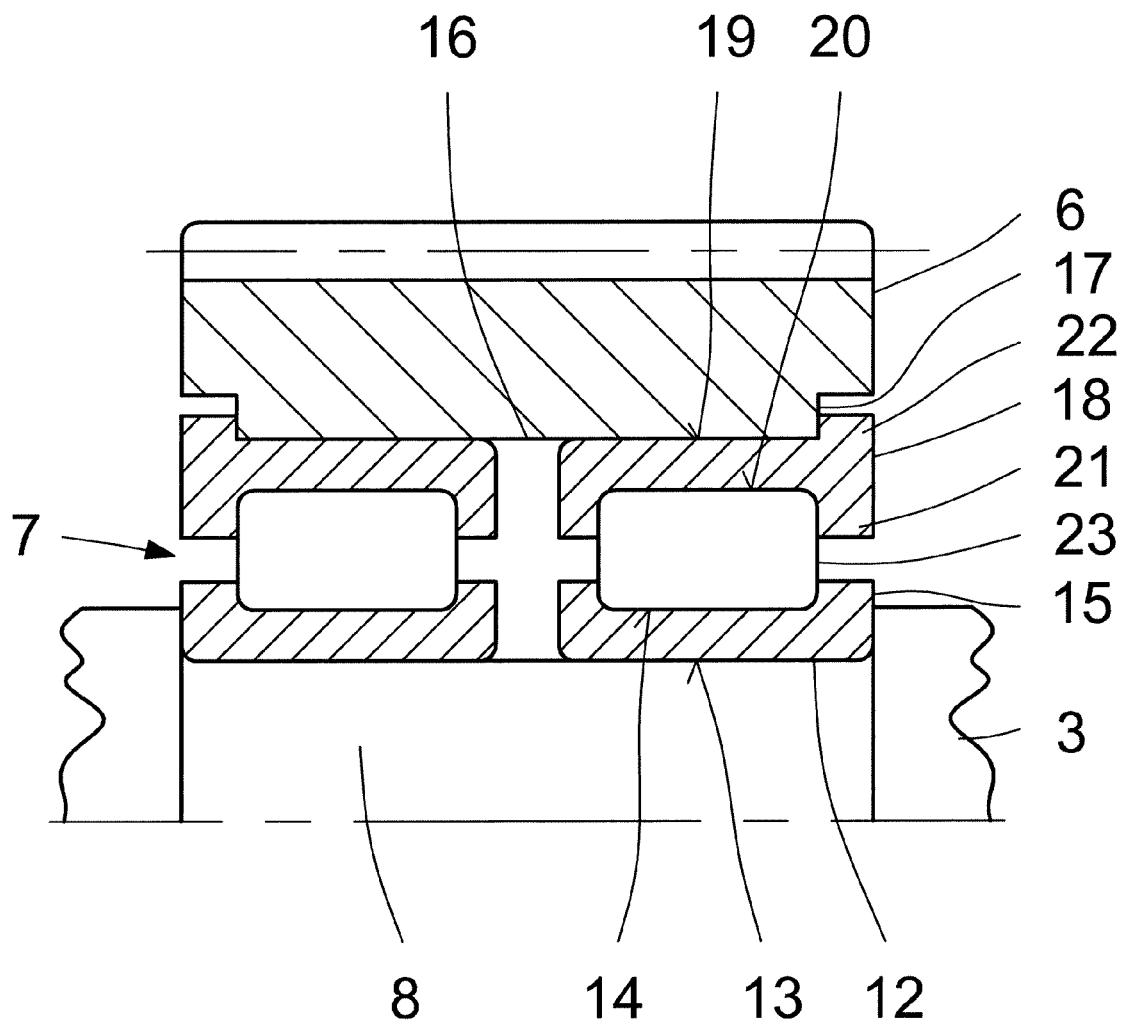

FIG. 3 shows, in sectional view, a further exemplary embodiment of the inventive rolling-element bearing assembly of the inventive planetary transmission shown in FIG. 1.

The exemplary embodiment shown in FIG. 3 differs from FIG. 2 with respect to the formation of the inner rings 12 and of the outer rings 18. In contrast to FIG. 2, according to FIG. 3 the inner rings 12 each have only one stop flange 15. Each of these stop flanges 15 is oriented outwards relative to the bore 16. In contrast to FIG. 2, the outer rings 18 have not only one, but two stop flanges 21, which are respectively disposed on both sides of the rolling-element raceways 20 of the outer rings 18. The exemplary embodiment shown in FIG. 3 otherwise corresponds to FIG. 2.

Figure 4:
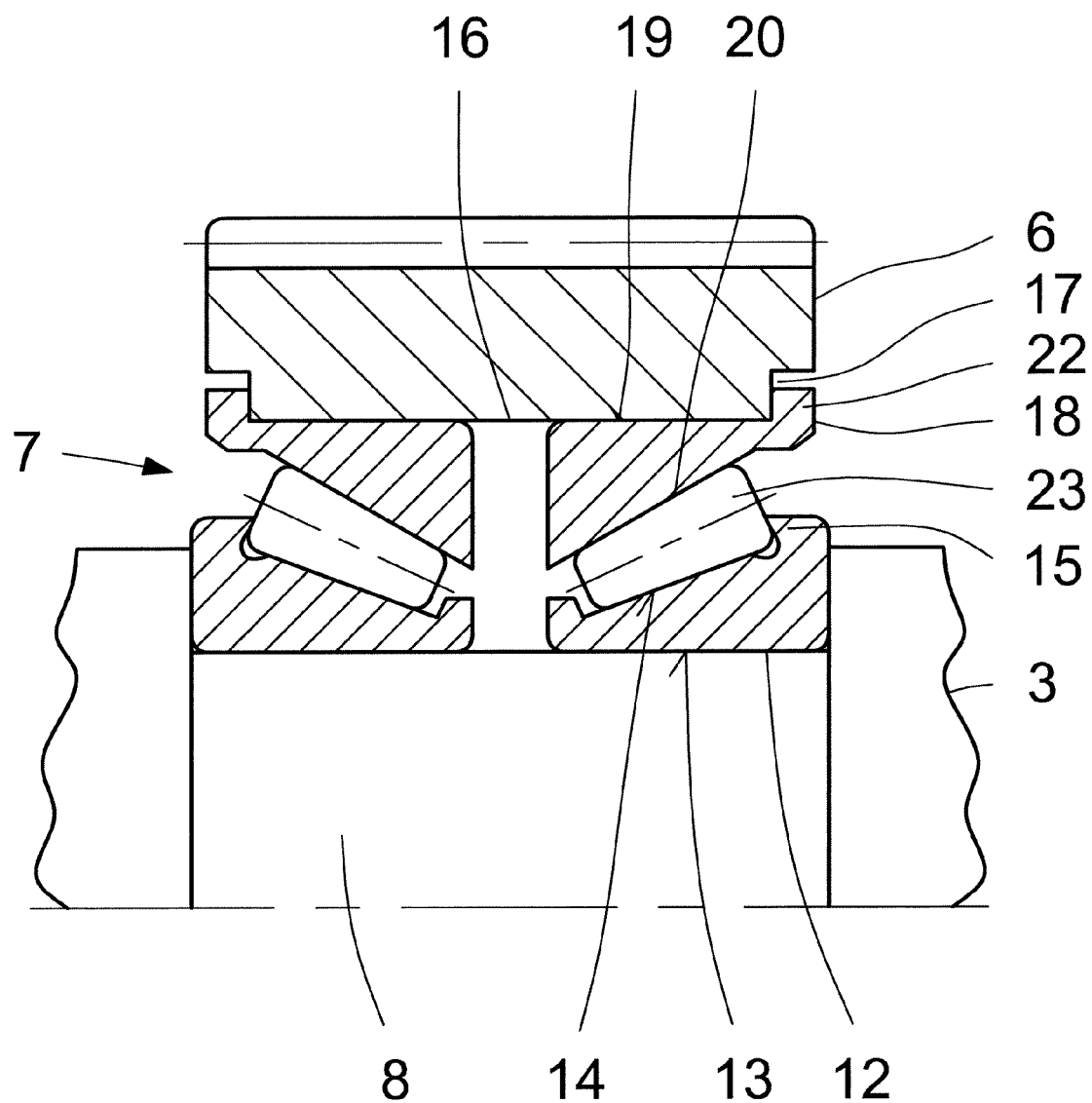

FIG. 4 shows, in sectional view, a further exemplary embodiment of the inventive rolling-element bearing assembly of the inventive planetary transmission shown in FIG. 1.

The exemplary embodiment shown in FIG. 4 differs from FIGS. 2 and 3 with respect to the formation of the inner rings 12 and the outer rings 18, as well as the rolling elements 23. In contrast to FIGS. 2 and 3, the inner rings 12 and the outer rings 18 according to FIG. 4 do not have cylindrical, but rather tapered, rolling-element raceways 14, 20. Furthermore, the rolling elements 23 are not formed cylindrical, but rather are tapered. The inner rings 12 are otherwise formed analogously to FIG. 2, and accordingly each have a stop flange 15 on both sides of the rolling-element raceways 14. The outer rings 18 have no stop flanges 21, but are formed analogously to FIGS. 2 and 3 with respect to the radial projection 22.

In all exemplary embodiments, one or more inner rings 12 and/or one or more outer rings 18 can respectively be formed multirow, i.e. have rolling-element raceways 14, 20 for a plurality of axially-adjacently-disposed sets of rolling elements 23. For example, the rolling-element bearing assembly can have two double row inner rings 12 and two double row outer rings 18. Likewise, a single row and a double row inner ring 12, as well as a single row and a double row outer ring 18, or any combinations can be provided. Here combinations are also possible wherein a multirow inner ring 12 is respectively combined with a plurality of single row outer rings 18, or vice versa. The combination of different multirow inner rings 12 and outer rings 18 is also possible.

In all exemplary embodiments, axially adjacent inner rings 12 and/or axial adjacent outer rings 18 can be respectively held axially spaced apart by a spacing ring. Generally speaking, this spacing ring is not axially fixed on the axle 8 or to the planetary gear 6.

In all exemplary embodiments, the inner rings 12 and the outer rings 18 can respectively be manufactured from a high-quality steel for rolling-element bearing applications. The stop flanges 15 can be formed as one-part with the inner rings 12. Likewise, the stop flanges 21 can be formed as one-part with the outer rings 18. In addition, the radial projections 22 can be formed as one-part with the outer rings 18. The diameter of the bore 16 of the planetary gear 6 outside each step 17 can be larger than 300 mm, and in particular can have values between 300 mm and 450 mm.

REFERENCE NUMBERS

1 Housing
2 Bolts
3 Support
4 Bearing assembly
5 Coupling
6 Planetary gear
7 Bearing assembly
8 Axle
9 Ring gear
10 Sun gear
11 Rotor
12 Inner ring
13 Seat surface
14 Rolling-element raceway
15 Stop flange
16 Bore
17 Step
18 Outer ring
19 Seat surface
20 Rolling-element raceway
21 Stop flange
22 Radial projection
23 Rolling elements

The invention claimed is:

1. A planetary transmission of a wind turbine including a ring gear which has an internal toothing, and at least one planetary gear which has an external toothing which meshes with the internal toothing of the ring gear, wherein
the planetary gear is rotatably supported on an axle by a bearing assembly,
the bearing assembly has at least one outer ring having a radially-outwardly-protruding radial projection and at least one set of rolling elements, which roll on the outer ring,
the planetary gear has a bore, and a recess in the region of an axial end, which recess radially widens the bore, and
the outer ring is disposed in the bore of the planetary gear such that the radial projection of the outer ring engages into the recess of the planetary gear.

2. The planetary transmission according to claim 1, wherein the outer ring is attached to the planetary gear.

3. The planetary transmission according to claim 1, wherein the radial projection of the outer ring is formed as one-part with the outer ring.

4. The planetary transmission according to claim 1, wherein the radial projection of the outer ring is disposed in the region of an axial end of the outer ring.

5. The planetary transmission according to claim 1, wherein the radial projection of the outer ring axially abuts on the planetary gear.

6. The planetary transmission according to claim 1, wherein the radial projection of the outer ring ends axially flush with the planetary gear or is set back with respect to the axial end of the planetary gear.

7. The planetary transmission according to claim 1, wherein the outer ring has a cylindrical seat surface which abuts in contact with the planetary gear in the region of the bore, and the radial projection of the outer ring protrudes radially outward beyond the seat surface.

8. The planetary transmission according to claim 1, wherein a plurality of sets of rolling elements roll axially adjacently to one another on the outer ring.

9. The planetary transmission according to claim 1, wherein a plurality of outer rings are disposed axially adjacent to one another.

10. A wind turbine including a planetary transmission according to claim 1.

11. A rolling element bearing assembly of a planetary transmission of a wind turbine, including
a planetary gear which has an external toothing and
a bearing assembly which rotatably supports the planetary gear on an axis, wherein
the bearing assembly has at least one outer ring having a radially-outwardly-protruding radial projection, and at least one set of rolling elements which roll on the outer ring,
the planetary gear has a bore, and a recess in the region of an axial end, which recess radially widens the bore, and
the outer ring is disposed in the bore of the planetary gear such that the radial projection of the outer ring engages into the recess of the planetary gear.

12. The planetary transmission according to claim 1, wherein the outer ring is attached to the planetary gear, wherein the radial projection of the outer ring is formed as one-part with the outer ring, wherein the radial projection of the outer ring is disposed in the region of an axial end of the outer ring and wherein the radial projection of the outer ring axially abuts on the planetary gear.

13. The planetary transmission according to claim 12, wherein the outer ring has a cylindrical seat surface which abuts in contact with the planetary gear in the region of the bore, and the radial projection of the outer ring protrudes radially outward beyond the seat surface, wherein a plurality of sets of rolling elements roll axially adjacently to one another on the outer ring, and wherein a plurality of outer rings are disposed axially adjacent to one another.

14. The planetary transmission according to claim 1, wherein the outer ring has a cylindrical seat surface which abuts in contact with the planetary gear in the region of the bore, and the radial projection of the outer ring protrudes radially outward beyond the seat surface, wherein a plurality of sets of rolling elements roll axially adjacently to one another on the outer ring, and wherein a plurality of outer rings are disposed axially adjacent to one another.

\* \* \* \* \*